Patented Jan. 23, 1951

2,539,376

UNITED STATES PATENT OFFICE 2,539,376

PROCESS FOR THE PRODUCTION OF STRAIN-FREE MASSES FROM CROSSED-LINKED POLYMERIZED METHYLMETH-ACRYLATE

Johann Josef Peter Staudinger, Ewell, and Henry Malcolm Hutchinson, Banstead, England, assignors to The Distillers Company Limited, Edinburgh, Scotland, a British company No Drawing. Application January 12, 1948, Serial No. 1,904. In Great Britain July 23, 1941

13 Claims. (Cl. 260—45.5)

This invention relates to the treatment of cross-linked polymethylmethacrylates and has as one object the production of thick resinous masses free from strain and voids. A further object is the production of thick sheets or blocks of clear, void-free and strain-free material suitable for optical use.

It is known that, during the polymerisation of methyl methacrylate, shrinkage occurs irregularly and that, while thin sheets may be obtained free from bubbles and strain by block polymerisation, the method generally fails with thick layers and gives sheets exhibiting strain and frequently containing voids unless the polymerisation is effected under a considerable pressure. In this connection, the incorporation of cross-linking agents, such as those described by Norrish and Brookman in "Proceedings of the Royal Society" 1937 163A 205–220, into the methyl methacrylate before polymerisation confers no improvement.

It is also known that pure polymerised methyl methacrylate may be softened by the incorporation of fluid methyl methacrylate, and it has been proposed that the so-softened polymer should be used in the moulding of dental restorations, but it will be appreciated that such restorations are necessarily thin, and that the present problem of overcoming the development of strains during the block polymerisation of thick layers does not arise in that case.

Cross-linked polymers of methyl methacrylate, which are copolymers of methyl methacrylate and cross-linking agents, are known, and the function of cross-linking agents has been described by Norrish and Brookman in the above-mentioned paper, by Staudinger in "Berichte der deutschen chemischen Gesellschaft" 1934 67 p. 1164 and by others. The cross-linked polymers are available with any of a wide range of solubility characteristics, and those which are swollen by treatment with ethyl acetate but which are substantially insoluble are herein termed "swellable, insoluble cross-linked polymethylmethacrylate."

Cross-linking agents are well known in the art, being compounds having a plurality of groupings in the molecule, each of which confers the ability to take part in addition copolymerisation in the system in question, and divinyl benzene is a typical example. Other cross-linking agents which have been described include divinyl ether, divinyl sulphide, divinyl acetylene, acrylic and methacrylic anhydride, crotonic anhydride, the esters of polyhydric alcohols with acrylic acid, alpha-substituted acrylic acid or crotonic acid, and the vinyl esters of dicarboxylic acids, but it is to be understood that cross-linked polymethacrylate which has been prepared in a previous step with the aid of other cross-linking agents, or otherwise acquired, may be employed in the present process.

The present invention provides a process for the formation of thick masses of void-free and strain-free synthetic resinous material from smaller masses of swellable, insoluble, cross-linked polymethyl methacrylate which consists in subjecting said smaller masses to at least one cycle of operations comprising swelling in a normally liquid monomeric polymerisable organic compound and thereafter polymerising the absorbed monomer by means of heat, with the aid of a polymerisation catalyst if desired.

If a product of increased toughness is required, the soaking liquid may be mixed with a proportion of a cross linking agent.

When the soaking liquid is a lower methacrylic or acrylic ester, and in certain other cases, the resulting resin is not only strain- and void-free but is of exceptional transparency and therefore particularly suitable for optical use, and in these cases optical plates may be prepared directly by holding the swollen cross-linked polymer between glass sheets during polymerisation. A valuable feature of the optical plates which may be formed by the present process is that, by varying the type of the original cross-linked polymer, the type of soaking liquid and the type of cross-linking agent (if any) added to the latter, a considerable range of optical characteristics may be obtained.

When the original cross-linked polymethylmethacrylate mass is immersed in the liquid monomer, it swells and absorbs considerable quantities of monomer, increasing in volume up to ten-fold or even more, depending on the degree of cross-linking, on the temperature, on the nature of the materials present and on whether the absorption is allowed to proceed to saturation. The product at this stage is a gel, and is heated to polymerise the absorbed monomer. During polymerisation, shrinkage takes place as in the case of the un-cross-linked polymer, but here the shrinkage is, surprisingly, uniform and does not result in the formation of strains or voids. In order to build up blocks of considerable thickness, the process may be repeated a number of times.

The following examples illustrate the manner in which the invention may be carried into effect:

Example 1

A block of polymethyl methacrylate, cross-linked with 0.05% by weight of divinyl benzene, was steeped in vinyl ethyl ketone for two days at 25° C., when it was found to have increased in weight to 600% of the original. The resulting gel was polymerised by heating for 48 hours at 130° C. in a sealed container in the absence of oxygen, to give a tough resin free from strain and voids.

Example 2

A block of a copolymer of methyl methacrylate and 0.05% by weight of divinyl benzene was swollen in sec. butyl methacrylate until it had reached 500% of its original weight. The resulting gel was polymerised by heating at 100° C. between glass plates in a closed container for 20 hours to give a sheet of clear tough resin suitable for optical work.

Example 3

A block of polymethyl methacrylate, cross-linked with 1% by weight of methacrylic anhydride, was swollen in methyl methacrylate until it had reached 200% of its original weight. Polymerisation as in Example 2 then gave a sheet of clear, tough resin suitable for optical work.

Example 4

A sheet of polymethyl methacrylate, cross-linked with 0.1% by weight of diallyl sebacate, was swollen in sec. butyl acrylate until it had reached 700% of its original weight. Polymerisation in the absence of air at 130° C. for 10 hours and then at 160° C. for 10 hours gave a clear, tough resin free from strain and voids.

The swelling and polymerisation steps of this example were then repeated for a further two cycles, the steeping being allowed to continue in the second and third cycles until the weight increases were to 500% and 300% of the preceding weight respectively, and the resulting block of optical resin was found to be about 4½ times as thick as the original sheet.

This application is a continuation-in-part of our abandoned copending application, Serial No. 462,296, filed on the 16th October, 1942.

What we claim is:

1. A process for the formation of thick masses of void-free and strain-free synthetic resinous material from smaller masses of a swellable, insoluble, cross-linked copolymer of methylmethacrylate and a copolymerizable cross-linking agent which is an ethylenically unsaturated comonomer which is copolymerizable with the methacrylate compound and which cross-linking agent is selected from the group consisting of divinyl benzene, divinyl ether, divinyl sulphide, divinyl acetylene, acrylic anhydride, methacrylic anhydride, crotonic anhydride, esters of polyhydric alcohols with acrylic acid, alpha-substituted acrylic acid and crotonic acid, and diallyl sebacate, which consists in subjecting said smaller masses to at least one cycle of operations comprising swelling in a normally liquid polymerizable ethylenically unsaturated compound selected from the group consisting of methylmethacrylate, butyl methacrylate, butyl acrylate, and vinyl ethyl ketone and thereafter polymerizing the absorbed monomer by means of heat.

2. A process according to claim 1, in which the product is rendered tougher by the incorporation of 0.05 to 1% by weight of a cross-linking agent which is an ethylenically unsaturated comonomer which is copolymerizable with the methacrylate compound and which cross-linking agent is selected from the group consisting of divinyl benzene, divinyl ether, divinyl sulphide, divinyl acetylene, acrylic anhydride, methacrylic anhydride, crotonic anhydride, esters of polyhydric alcohols with acrylic acid, alpha-substituted acrylic acid and crotonic acid, and diallyl sebacate, in said normally liquid polymerizable ethylenically unsaturated compound.

3. A process according to claim 1, in which said normally liquid polymerizable ethylenically unsaturated compound is methyl methacrylate.

4. A process according to claim 1, in which the product is rendered tougher by the incorporation of 0.05 to 1% by weight of a cross-linking agent which is an ethylenically unsaturated comonomer which is copolymerisable with the methacrylate compound and which cross-linking agent is selected from the group consisting of divinyl benzene, divinyl ether, divinyl sulphide, divinyl acetylene, acrylic anhydride, methacrylic anhydride, crotonic anhydride, esters of polyhydric alcohols with acrylic acid, alpha-substituted acrylic acid and crotonic acid, and diallyl sebacate, and in which said normally liquid compound is methyl methacrylate.

5. A process according to claim 1, in which said normally liquid polymerizable ethylenically unsaturated compound is butyl methacrylate.

6. A process according to claim 1, in which the product is rendered tougher by the incorporation of 0.05 to 1% by weight of a cross-linking agent which is an ethylenically unsaturated comonomer which is copolymerisable with the methacrylate compound and which cross-linking agent is selected from the group consisting of divinyl benzene, divinyl ether, divinyl sulphide, divinyl acetylene, acrylic anhydride, methacrylic anhydride, crotonic anhydride, esters of polyhydric alcohols with acrylic acid, alpha-substituted acrylic acid and crotonic acid, and diallyl sebacate, and in which said normally liquid compound is butyl methacrylate.

7. A process according to claim 1, in which said normally liquid polymerizable ethylenically unsaturated compound is butyl acrylate.

8. A process according to claim 1, in which said normally liquid polymerizable ethylenically unsaturated compound is vinyl ethyl ketone.

9. A process according to claim 1, in which the polymerisation is effected while the swollen cross-linked polymer is supported between glass plates.

10. A process according to claim 1, in which said normally liquid polymerizable ethylenically unsaturated compound is methylmethacrylate, and in which the polymerization is effected while the swollen cross-linked polymer is supported between glass plates.

11. A process according to claim 1, in which said normally liquid polymerizable ethylenically unsaturated compound is butyl methacrylate, and in which the polymerization is effected while the swollen cross-linked polymer is supported between glass plates.

12. A process according to claim 1 in which the product is rendered tougher by the incorporation of 0.05 to 1% by weight of a cross-linking agent which is an ethylenically unsaturated comonomer which is copolymerisable with the methacrylate compound and which cross-linking agent is selected from the group consisting of divinyl benzene, divinyl ether, divinyl sulphide, divinyl acetylene, acrylic anhydride, methacrylic anhydride, crotonic anhydride, esters of polyhydric alcohols with acrylic acid, alpha-substituted acrylic acid and crotonic acid, and diallyl sebacate, in said normally liquid polymerizable ethylenically unsaturated compound, and in which the polymerization is effected while the swollen cross-linked polymer is supported between glass plates.

13. A process according to claim 1, in which said normally liquid polymerizable ethylenically unsaturated compound is butyl acrylate, and in which the polymerization is effected while the swollen cross-linked polymer is supported between glass plates.

JOHANN JOSEF PETER STAUDINGER.
HENRY MALCOLM HUTCHINSON.

REFERENCES CITED

The following references are of record in the file of this patent:

UNITED STATES PATENTS

| Number | Name | Date |
|---|---|---|
| 1,683,401 | Ostomislensky | Sept. 4, 1928 |
| 2,089,444 | Staudinger | Aug. 10, 1937 |
| 2,234,993 | Vernon | Mar. 18, 1941 |
| 2,332,461 | Muskat | Oct. 19, 1943 |

FOREIGN PATENTS

| Number | Country | Date |
|---|---|---|
| 540,940 | Great Britain | Nov. 6, 1941 |

OTHER REFERENCES

Zapp: Ind. Eng. Chem., 40, pages 1508–1517 (Aug. 1948).

Norrish et al., Proc. Royal Society (London), vol. A 163, pages 205–220 (1937).